United States Patent [19]

Suzuki

[11] Patent Number: 5,844,695
[45] Date of Patent: Dec. 1, 1998

[54] IMAGE READING SYSTEM

[75] Inventor: Naohisa Suzuki, Yokohama, Japan

[73] Assignee: Canon Kabushiki Kaisha, Tokyo, Japan

[21] Appl. No.: 758,305

[22] Filed: Dec. 3, 1996

[30] Foreign Application Priority Data

Dec. 7, 1995 [JP] Japan .................................. 7-319283

[51] Int. Cl.⁶ .............................. H04N 1/04; H04N 1/32
[52] U.S. Cl. ..................... 358/475; 358/474; 358/468; 358/401
[58] Field of Search ..................... 358/475, 463, 358/461, 482, 483, 509, 505, 474, 451, 468, 400, 401, 412, 409, 497, 486, 421; 348/370, 371

[56] References Cited

U.S. PATENT DOCUMENTS

| | | | |
|---|---|---|---|
| 4,791,493 | 12/1988 | Ogura et al. ............................. | 358/475 |
| 4,809,061 | 2/1989 | Suzuki .................................... | 358/514 |
| 5,450,215 | 9/1995 | Iwama .................................... | 358/475 |
| 5,495,361 | 2/1996 | Cresens .................................. | 358/509 |
| 5,500,746 | 3/1996 | Aida ....................................... | 358/514 |
| 5,514,864 | 5/1996 | Mu-Tung et al. ....................... | 358/475 |
| 5,568,273 | 10/1996 | Sato et al. .............................. | 358/451 |
| 5,625,470 | 4/1997 | Ueta et al. .............................. | 358/509 |

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

A scanner unit moves in the scanning direction to read an original image, and thereafter, returns to the home position. In this case, the accumulation time of a line CCD is selected to set the resolution, and a control processing unit controls the product of the LED current in the optical system and the accumulation time to always become constant, thereby stabilizing heat accumulation of the LED. During movement in the return direction, the LED current is set to be lower than that upon reading, and the average current in the two directions is controlled to become constant irrespective of the accumulation time.

88 Claims, 12 Drawing Sheets

IMAGE READING SYSTEM

BACKGROUND OF THE INVENTION

1. Field of the Invention

The present invention relates to an image reading system for reading an original image in, e.g., an image scanner, a facsimile apparatus, and the like and, more particularly, to an image reading system suitably used in an original reading apparatus which illuminates an original using a linear light source comprising an LED (light-emitting diode) array and senses the linear image using a CCD (charge coupled device) one-dimensional image sensor.

2. Related Background Art

As a conventional image reading apparatus used in, e.g., a scanner, a facsimile apparatus, and the like, an apparatus using a reduction optical system, as shown in FIG. 14, is known.

This apparatus comprises a light source 55 which extends in the longitudinal direction to illuminate an original 56, a mirror 54 for bending the optical path to make the entire apparatus compact, a lens 52 for imaging original information light, a correction plate (shading plate) 53 for correcting the lens cosine rule of the white output waveform, and a line CCD image sensing element (to be referred to as a CCD hereinafter) 51 for converting optical information into an electrical signal. The apparatus also comprises an IC (not shown) comprising, e.g., an A/D converter for A/D converting an image signal output from the CCD 51 before the image signal is transferred to an image processing system, and the like. The subsequent shading correction circuit corrects variations of pixels of the line CCD output upon reading an original with reference to white variations among pixels called a white reference, since light emitted by the light source is not uniformly irradiated in the line direction, and the respective line CCDs have different pixel sensitivities.

Such image reading apparatus normally uses an inexpensive Xenon (Xe) lamp, an LED, or the like as the light source to attain a cost reduction of the apparatus.

However, in the conventional apparatus, since the Xe lamp, LED, or the like serving as the light source has a small absolute light amount, the accumulation time for reading of the CCD must be prolonged or the sensitivity of a light-receiving unit must be increased so as to obtain stable image information. Under the circumstances, although development associated with high-speed driving of CCD devices is underway, the light-receiving unit of the CCD for photoelectrically converting optical information of an original has limited sensitivity characteristics, and the original must be irradiated with light in a sufficient amount so as to obtain a stable, high S/N ratio. For this purpose, when the driving current of, e.g., the LED is increased to increase the light amount, the wavelength of light changes due to heat generated by the LED itself, and the current changes due to changes in forward voltage. As a consequence, a stable light amount cannot be obtained.

When the driving current of, e.g., the LED is varied based on the accumulation time, since the heat accumulation characteristics due to heat generated by the LED itself vary depending on the accumulation time, changes in output from the CCD sensor result.

Conventionally, a note or notebook type personal computer which comprises a printer unit and a scanner unit attached to the printer unit is commercially available. However, it has been desired to simplify the scanner circuit to attain a size reduction of the computer housing.

Furthermore, in a-note personal computer that can be driven by a secondary battery, the consumption power is required to be reduced as much as possible.

SUMMARY OF THE INVENTION

It is an object of the present invention to provide an image reading system that can read an image with high image quality.

It is another object of the present invention to provide a compact, energy-saving image reading system.

It is still another object of the present invention to provide an image reading system which can stabilize the illumination characteristics of a light source irrespective of the accumulation time.

In order to achieve the above object, according an embodiment of the present invention, an image reading apparatus comprises photoelectric conversion means for converting light from an original into an image signal, a light source for illuminating the original, and control means for controlling a product of an accumulation time of a charge in the photoelectric conversion means and a current to be supplied to the light source to become constant.

Furthermore, according to another embodiment of the present invention, a control apparatus for an image reading apparatus, which has photoelectric conversion means for converting light from an original into an image signal, and a light source for illuminating the original, comprises control means for controlling a product of an accumulation time of a charge in the photoelectric conversion means and a current to be supplied to the light source to become constant.

With the above arrangement, high-quality image reading can be attained without wasting consumption power. Also, the illumination characteristics of the light source can be stabilized irrespective of the accumulation time.

Other objects and features of the present invention will become apparent from the following specification and the accompanying drawings.

BRIEF DESCRIPTION OF THE DRAWINGS

FIG. 10 is a graph showing the CCD output characteristics when the LED is continuously turned on;

DESCRIPTION OF THE PREFERRED EMBODIMENTS

Figure 1:
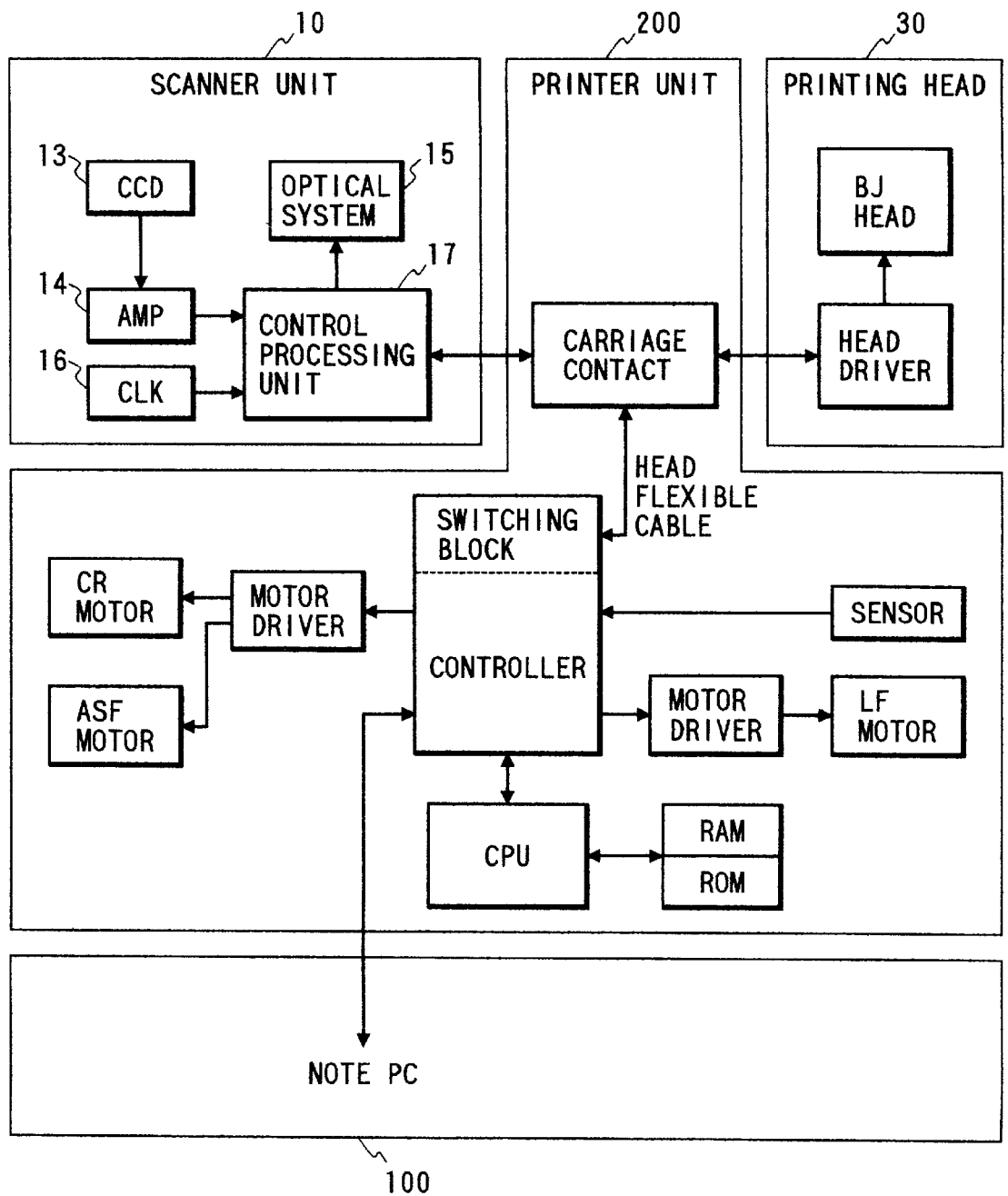
FIG. 1 is a block diagram showing an embodiment of a system to which the present invention is applied.

FIG. 1 shows an embodiment of a system when an image reading apparatus according to the present invention is used in a note personal computer.

Referring to FIG. 1, a printer unit 200 is built in a note personal computer (PC) 100. A scanner unit 10 serving as an image reading apparatus and a printing head 30 are selectively connected to the printer unit 200.

The scanner unit 10 comprises a CCD 13, an amplifier 14 for amplifying the output from the CCD 13, an optical system 15 including a light source for illuminating an original, a clock generation circuit 16, a control processing unit 17 for performing A/D conversion, shading correction, control of the optical system 15, and the like, and so on.

In the scanner unit 10, the above-mentioned CCD output is input to the control processing unit 17 comprising an image processing system including an A/D converter, shading correction circuit, edge emphasis, binarization, and the like. The control processing unit 17 serially transfers image data after image processing to the printer unit 200 via a head flexible cable in synchronism with clocks. At the same time, the printer unit 200 can change the light source current by switching S1 and S2 shown in FIG. 9 (to be described later) and can control the image processing setting output timings, and the like in the control processing unit 17.

Figure 2:
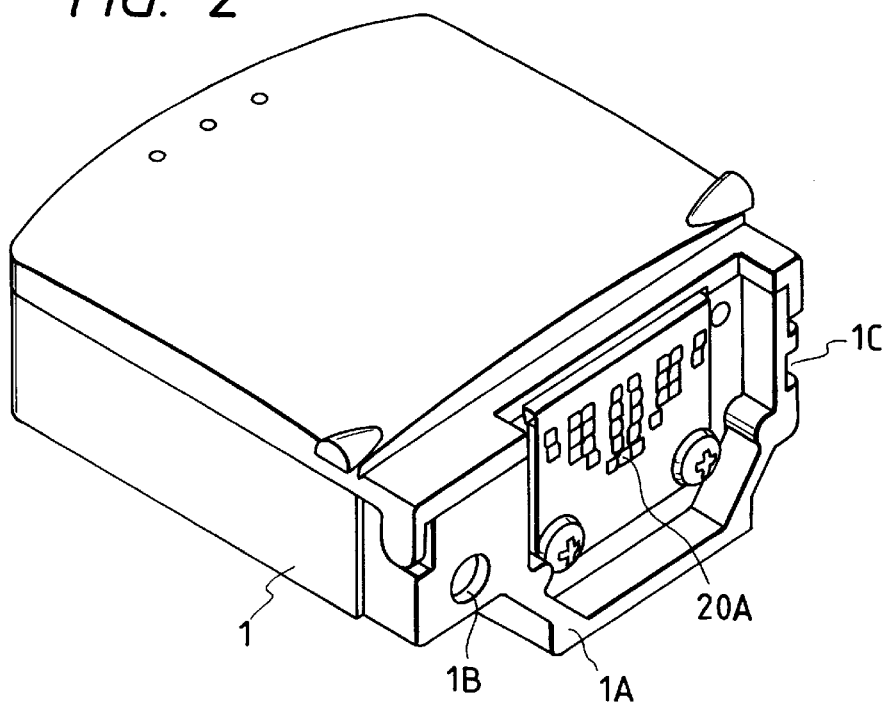
FIG. 2 is a perspective view showing the outer appearance of an embodiment of a scanner unit according to the present invention.

FIG. 2 shows the outer appearance of the scanner unit 10. Referring to FIG. 2, the scanner unit has an alignment hole 1B and an alignment groove 1C, which are used for performing position alignment when the scanner unit is set on a carriage. A reference wall 1 determines the posture in the reading direction, and the mounting position of the scanner unit is determined when the reference wall 1 is biased toward a reference wall (not shown) on the carriage side. A connector portion 20A serves as an internal I/F that attains electrical contacts when the scanner unit is mounted on the printer unit.

Figure 3:
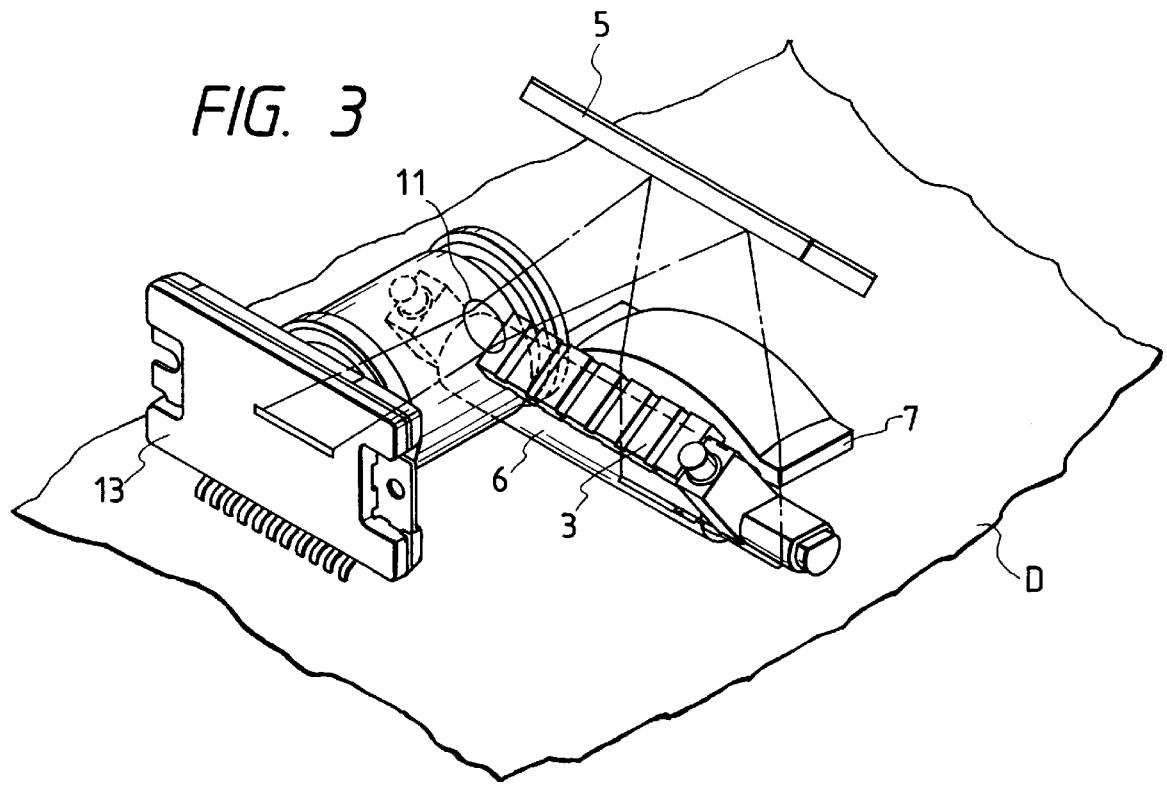
FIG. 3 is a perspective view showing the optical system parts layout of the scanner unit.

FIG. 3 shows the arrangement of the optical system 15. An original D is set at the lower side of the drawing.

Referring to FIG. 3, a plurality of LEDs (λ=570 nm) 3 serving as the light source are arranged to be longer than the reading width. A cylindrical rod lens 6 serving as a focusing means is arranged in the vicinity of the LEDs 3 to be parallel to the arrangement direction of the LEDs 3. The irradiation center of the LEDs 3 passes through the center of the lens effect surface of the rod lens 6, and obliquely irradiates the original surface.

Light reflected by the original passes through a field lens 7 serving as a first imaging system, the light source center of which is arranged in a direction substantially perpendicular to the original, and the propagation direction of the optical axis is bent by 90° by a mirror 5 elongated in the reading width direction, thus obtaining light rays substantially parallel to the original. The imaging surface of the field lens 7 is set at the position of an aperture 11. An imaging lens (not shown) serving as a second imaging system lens is arranged behind the aperture 11.

The imaging position of the imaging lens matches the position of the photoelectric conversion element (CCD) 13. Note that the imaging system lens is set at a reduction ratio of 0.45158.

The line CCD sensor 13 consists of 128 pixels, which are optically aligned in a direction perpendicular to the carrier driving direction (main scanning direction). Therefore, the pixels optically aligned in the direction perpendicular to the carrier are arranged to optically obtain a pixel resolution of 360 dpi in the vertical direction (sub-scanning direction). The accumulation time can be varied depending on the relationship between the carrier moving speed and the resolution in the carrier moving direction, and the carrier moving speed and the accumulation time can be independently controlled. More specifically, when the carrier motor driving speed is 651 pps, the resolution in the carrier moving direction is 360 dpi when the accumulation time is set to be 256 μsec. When the accumulation time is set to be 512 μsec while the carrier speed remains the same, the resolution in the carrier moving direction becomes 180 dpi.

In the printer unit 200 shown in FIG. 1, a printer CPU and a controller perform control of three motors (for carriage (CR), line feed (LF), and auto sheet feed (ASF)), control of four sensors (for home position detection, ASF position detection, sheet feed detection, and sheet exhaust detection), and driving control of the scanner unit and the printing head. One of the scanner unit 10 and the printing head 30 can be freely attached/detached to/from the printer unit 200. The controller can switch various signals. The printer CPU switches between printer control and scanner control via a connection unit. More specifically, the CPU scans and stores scan information for one line in a RAM by driving various motors, and transfers the scanned information to the note PC 100 main body via the connected interface while performing development processing after scanning. The PC main body joins such 1-line data for the entire region, performs desired image processing of the joined data, and thereafter, files the processed data. The scanner unit or the printing head and its joint portion are connected by biasing the respective units upon mounting since contact electrodes are provided to the carriage portion of the printer unit. In this case, as a method of discriminating the mounted unit, each unit has a 2-bit head ID in its carriage contact portion, and after the unit is mounted, the head ID is loaded to discriminate the scanner unit 10 or the printing head 30 so as to change the contents of control pins in correspondence with the discriminated unit.

The attachment state to the printer unit will be described below with reference to FIG. 4.

Figure 4:
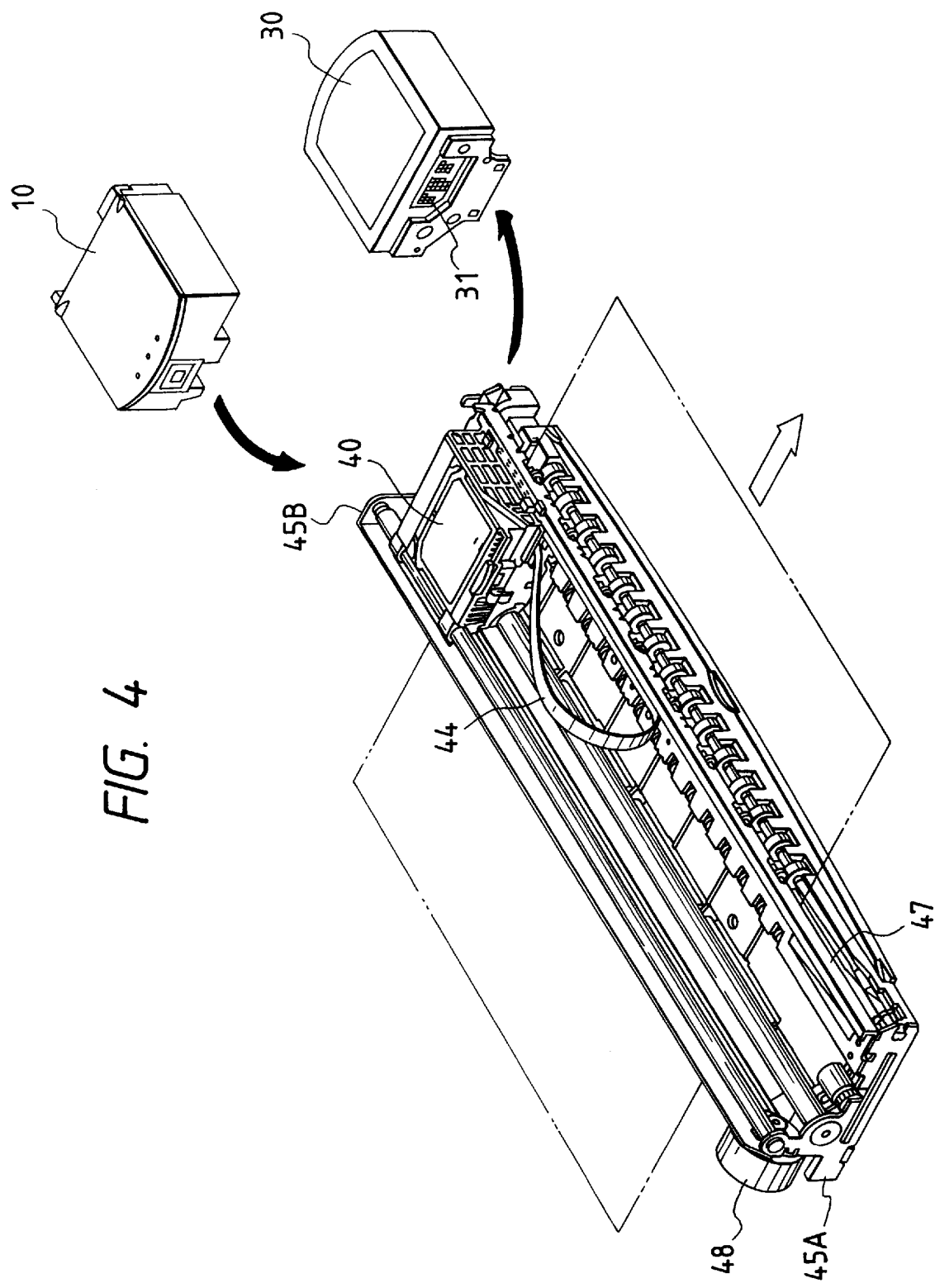
FIG. 4 is a perspective view showing the attachment/detachment state of the scanner unit and a printing head to/from a printer.

The scanner unit 10 has substantially the same shape as that of the printing head 30 used in the printer, and constitutes a cartridge, as shown in FIG. 4. A carriage 40 has a contact portion that transmits/receives a reading signal from the main body via the connector portion of the scanner unit 10. The reading signal from the CCD 13 is processed by the CPU in the printer unit 200 via the contact portion and a flexible cable 44.

The carriage 40 reciprocally moves between side plate portions 45A and 45B of a frame along a slide shaft and a slide plate 47 to attain reading. A driving motor 48 moves the carriage 40 via a belt.

Figure 5:
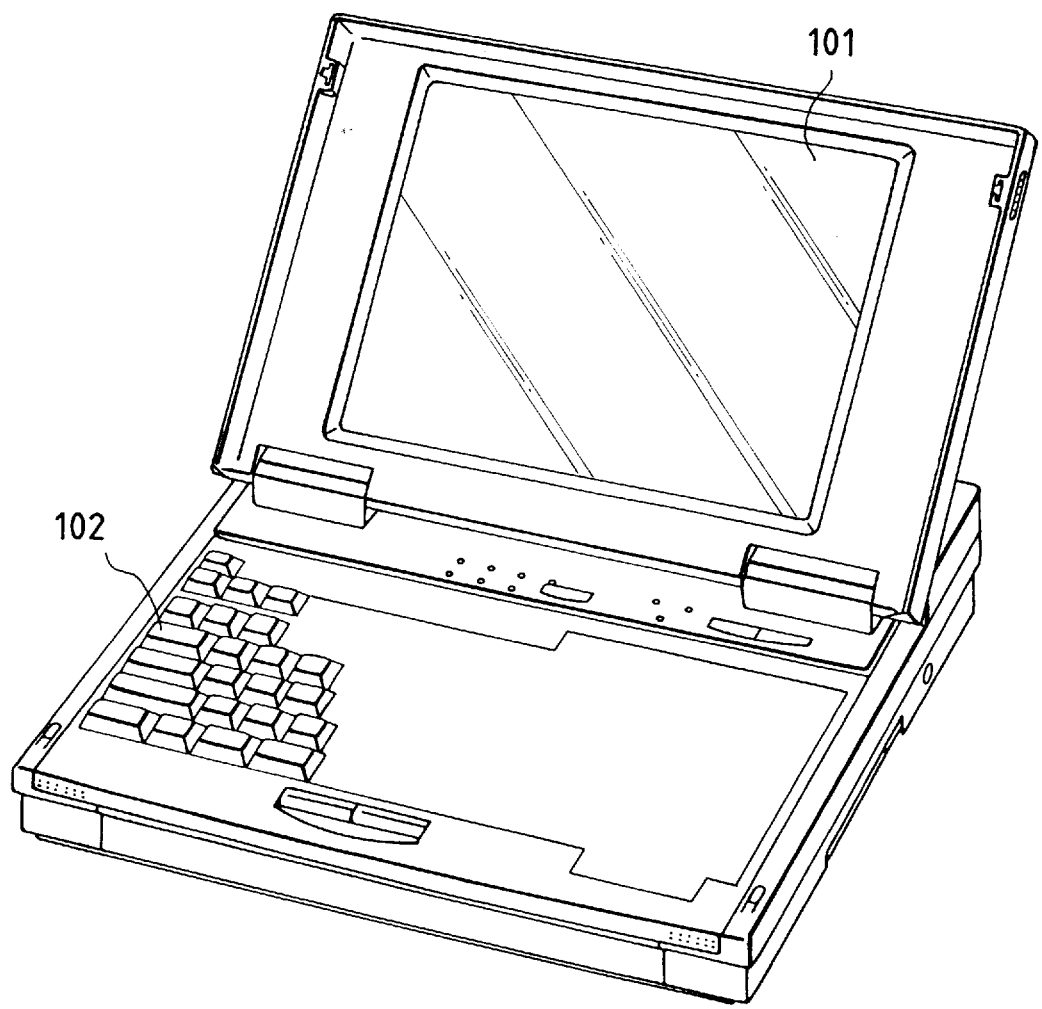
FIG. 5 is a perspective view showing the outer appearance of a note personal computer.

FIG. 5 shows the outer appearance of the note PC 100. A liquid crystal display device 101 is a TFT 11.8" color display, and is free to open/close. A keyboard 102 can be operated when the liquid crystal display device 101 is opened, as shown in FIG. 5. Although not shown, the printer unit is stored in the rear portion of the main body.

Figure 6:
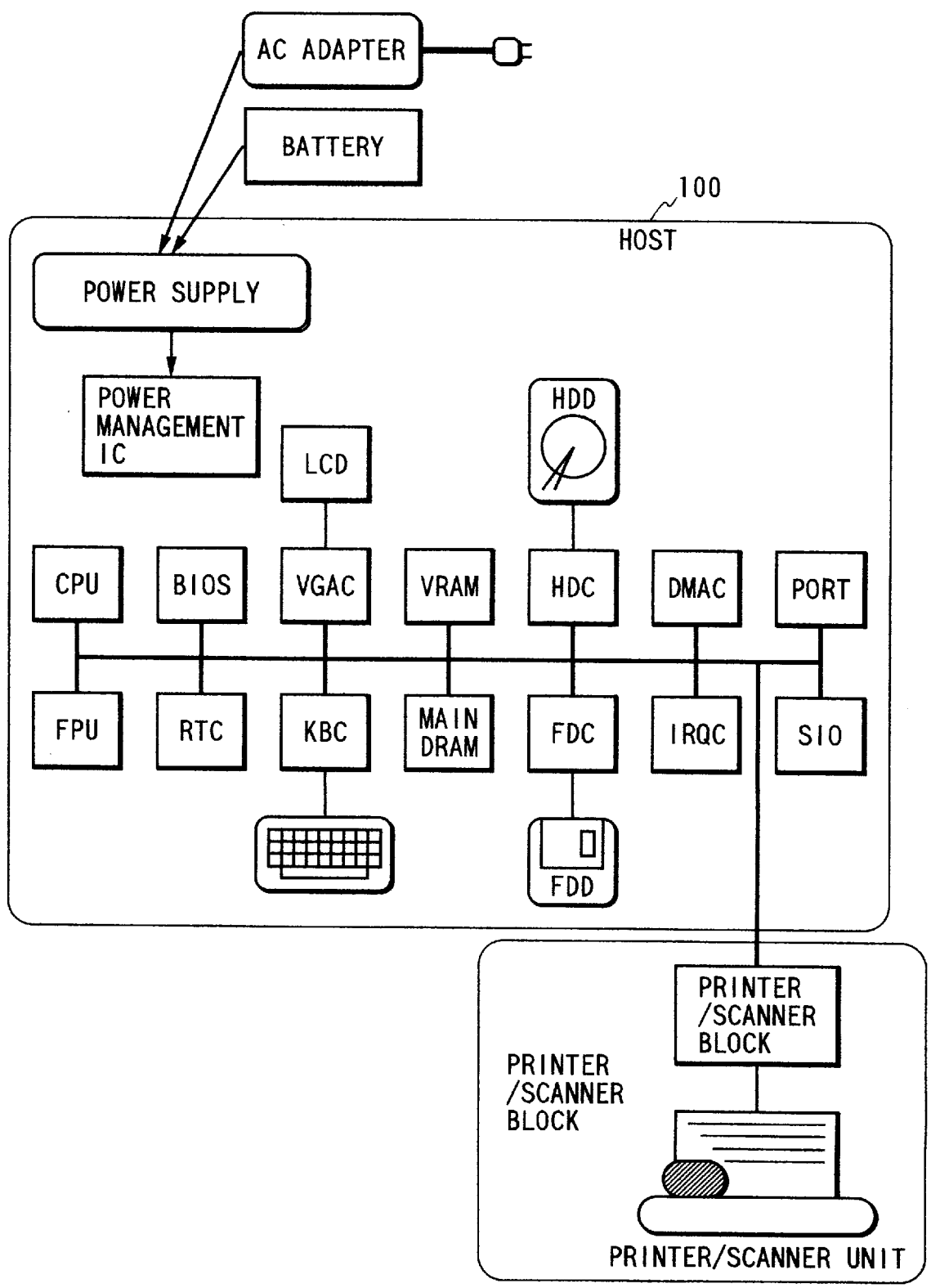
FIG. 6 is a block diagram of the note personal computer.

FIG. 6 is a block diagram of the note PC 100. As a driving source, an AC adapter (rated voltage =20 [V], 54 [W]) and a nickel hydrogen secondary battery (rated voltage =12 [V], 2,700 [mA/h]) are available. The PC 100 has, as its built-in functions, peripheral device controllers such as a floppy disk controller (FDC), a hard disk controller (HDC), a keyboard controller (KBC), a VGA controller (VGAC), and the like. Furthermore, the PC 100 is connected to the built-in printer unit via an internal bus.

The electrical characteristics of the LEDs 3 serving as the light source will be explained below with reference to FIGS. 7 and 8.

Figure 7:
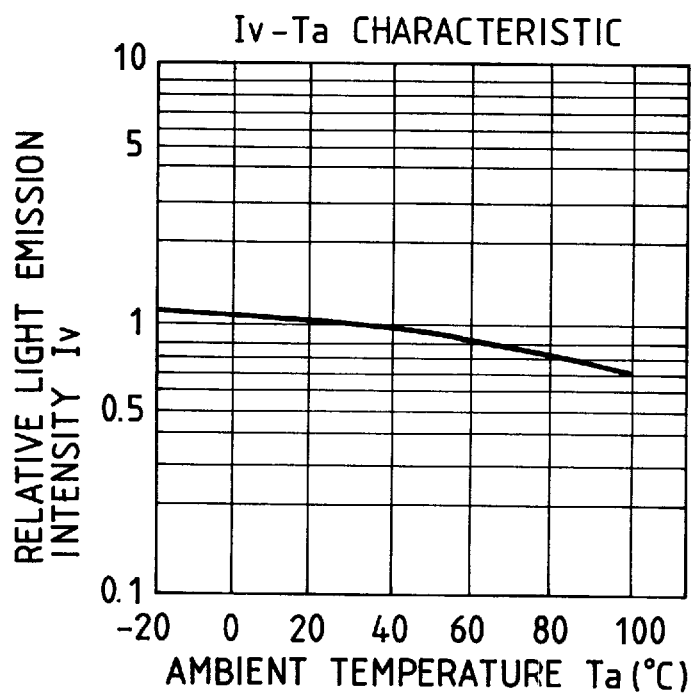
FIG. 7 is a graph showing the relative light emission intensity—temperature characteristics of an LED.

FIG. 7 is a graph showing the relationship between the ambient temperature (Ta) and the relative light emission intensity (Iv). As can be seen from FIG. 7, as the ambient temperature rises, the light emission intensity of the LEDs lowers.

Figure 8:
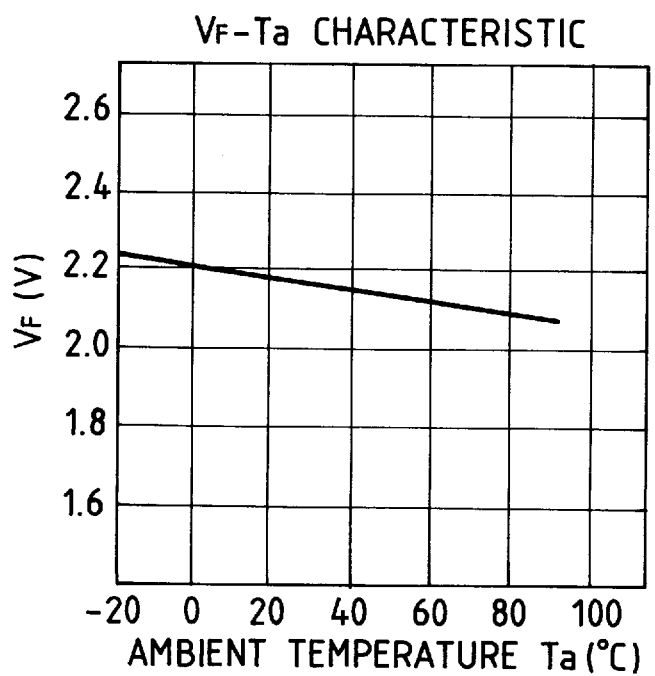
FIG. 8 is a graph showing the voltage—temperature characteristics of the LED.

FIG. 8 is a graph showing the relationship between the ambient temperature (Ta) and the forward voltage (VF). As can be seen from FIG. 8, as the ambient temperature rises, the forward voltage of the LEDs falls.

Figure 9:
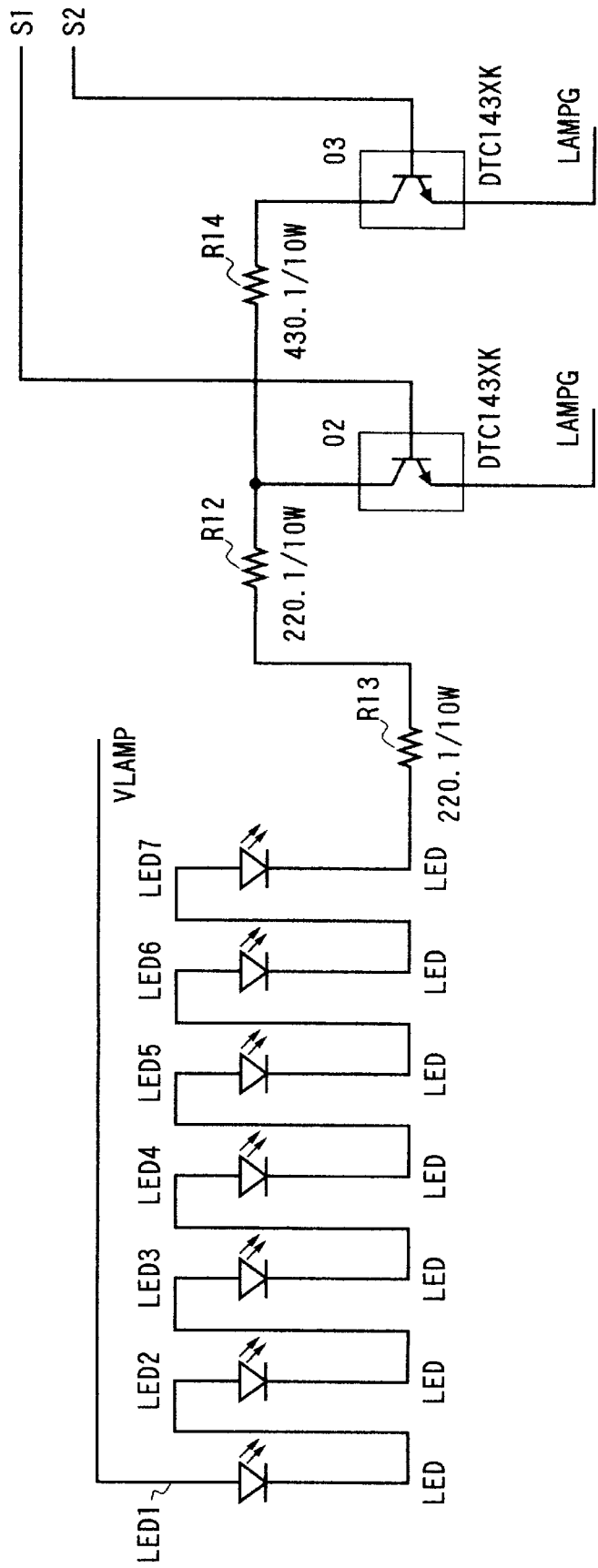
FIG. 9 is a circuit diagram of an LED driving circuit.

FIG. 9 shows an LED driving circuit. In order to house components in a compact body, the circuit must be simplified, and adopts a constant voltage driving system. As the LEDs serving as the light source, seven LEDs, i.e., LED1 to LED7 are arranged in series with each other, and each LED current can be switched in two steps. The current switching control is attached by switching transistors 02 and 03 by signals S1 and S2. When the signal S1 is "High" and the signal S2 is "Low", a high current (about 20 [mA]) flows; when the signal S1 is "Low" and the signal S2 is "High", a low current (about 10 [mA]) flows.

Figure 10:
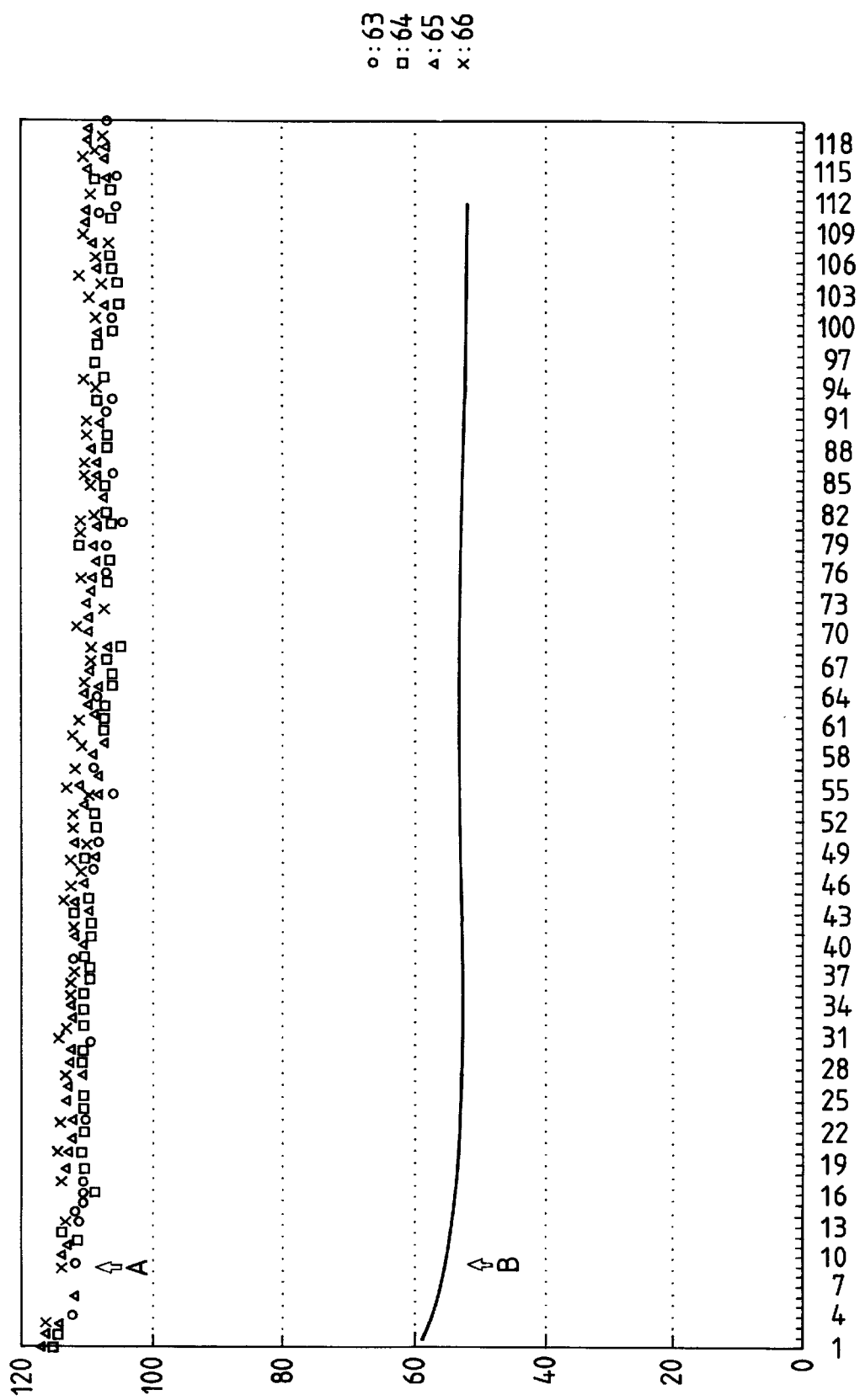

Normally performed control will be explained below. B in FIG. 10 indicates the CCD output data obtained when a white reference sheet fed from the printer unit 200 at the carrier speed of 651 pps is continuously read using the scanner unit 10 according to this embodiment while setting the accumulation time to be 256 [$\mu$sec] and the LED high current state (S1="High", S2="Low", 20 [mA]). On the other hand, A in FIG. 10 indicates the CCD output data obtained when the white reference sheet is continuously read while setting the accumulation time to be 512 [$\mu$sec] and the LED low current state (S1="Low", S2="High", 10 [mA]). The abscissa plots the time (unit: seconds) elapsed after the LEDs of the light source are turned on. The ordinate plots the difference between the numerical value fetched by the A/D converter and that fetched in the LED OFF state under the same condition when the CCD output from the scanner is expressed in 256 steps, and express a linear output with respect an actual input. The scanner unit of this embodiment has a reading width of 128 pixels, but data of the 63rd to 66th central portion pixels are adopted as representative values.

Figure 11:
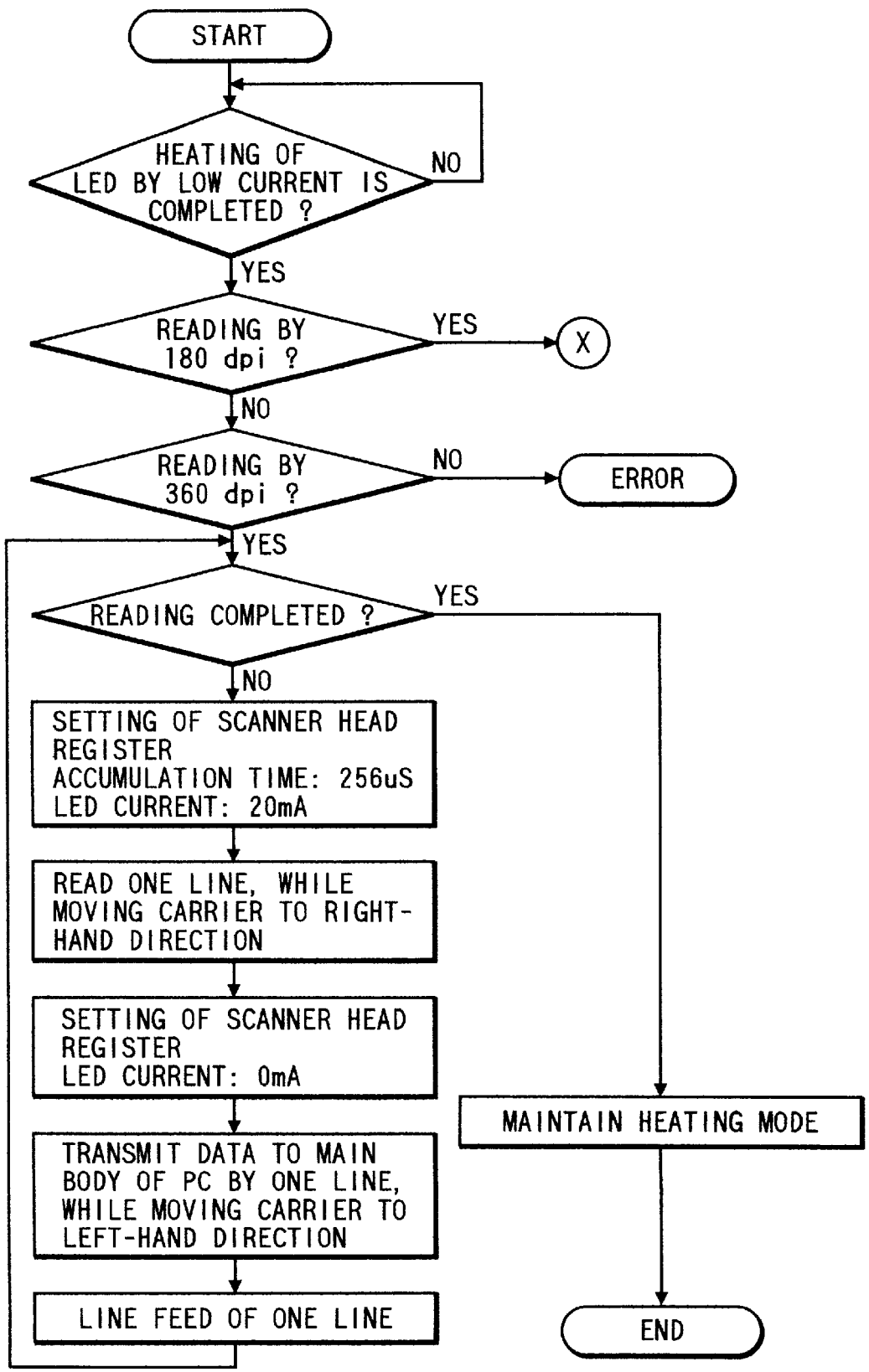
FIG. 11 is a flow chart showing the control operation.
Figure 12:
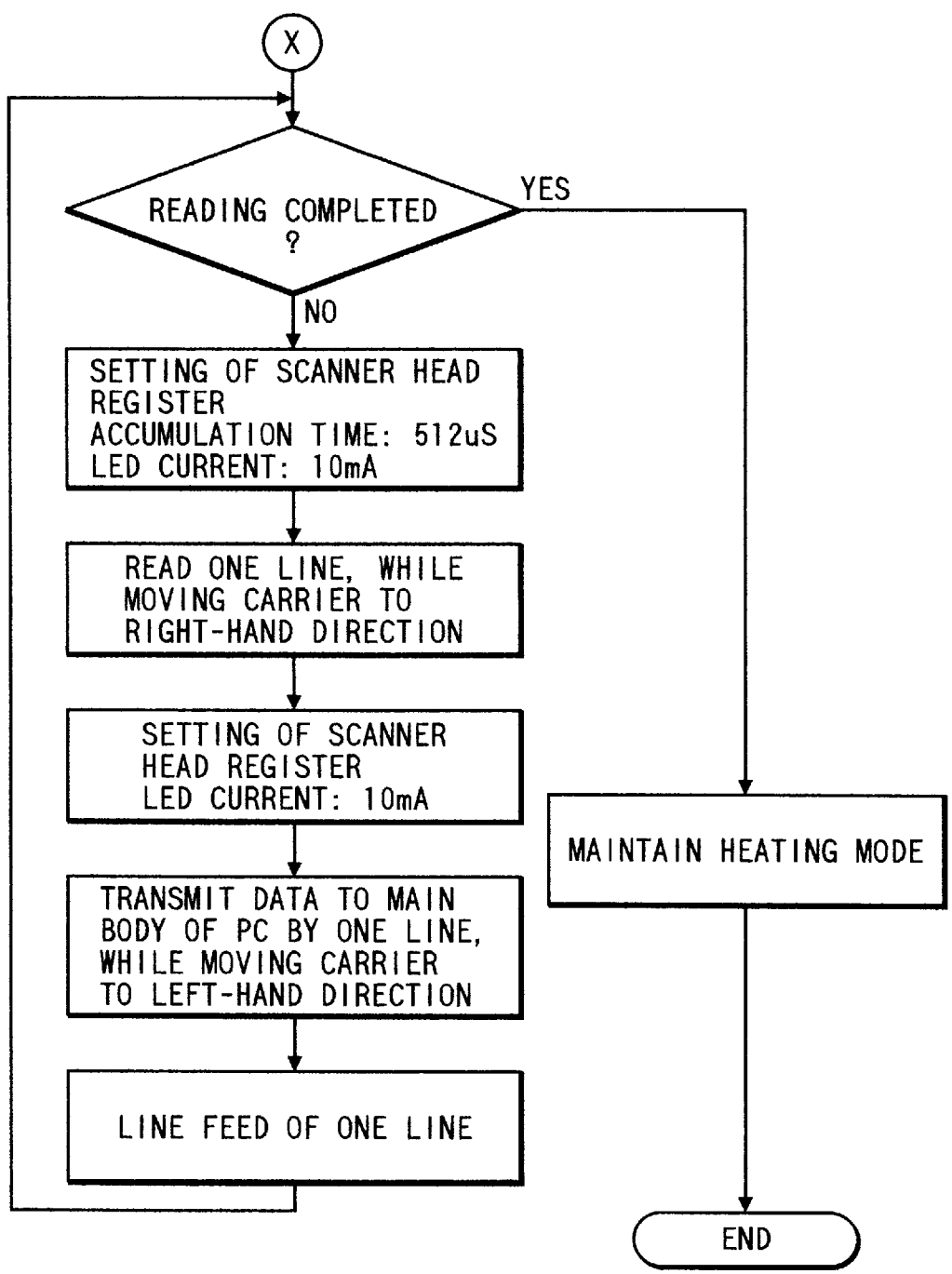
FIG. 12 is a flow chart showing the control operation.

Control according to the present invention will be described below with reference to FIGS. 11 and 12.

Upon reception of a reading start command from the note PC 100, an average current (the low current state since it is equal to 10 mA attained by S1="Low" and S2="High") upon reading is supplied to the LEDs to set a heating mode for turning on the LEDs in advance to stabilize them. After an elapse of a predetermined period of time in the heating mode, the processing branches depending on whether the resolution in the carrier moving direction of the reading mode is 180 dpi or 360 dpi.

If the resolution of 360 dpi is selected, it is checked if the reading region is completed. If the reading region is not completed, the accumulation time=256 [$\mu$sec] and the high current state (S1="High", S2="Low", 20 [mA]) are set in a register of the scanner unit, and data for 128 dots×one line (360 dpi) are read and stored in a buffer by the CCD arrangement while moving the carrier in the right-hand direction. Since one-way scanning is performed in this case, the accumulation time=256 [$\mu$sec] and the current OFF state (S1="Low", S2="Low", 0 [mA]) are set in a register of the scanner unit upon returning. Thereafter, the data for one line are transferred to the PC while being reading out from the reading buffer in which the data are temporarily stored. Finally, a line feed operation of one line is executed and the flow returns to the step of checking if the reading region is completed. If the reading region is not completed, the above-mentioned operations are repeated until the reading region is completed. If the reading region is completed, the control enters the heating mode, thus ending the reading operation in the reading range in the case of the resolution of 360 dpi.

In the case of 180 dpi, it is checked if reading is completed. Thereafter, if it is determined that the reading region is not completed, the accumulation time=512 [$\mu$sec] and the low current state (S1="Low", S2="High", 10 [mA]) are set in the register of the scanner unit, and data for 128 dots×one line (180 dpi) are read and stored in the buffer by the CCD arrangement while moving the carrier in the right-hand direction. Since one-way scanning is performed in this case, the low current state (S1="Low", S2="High", 10 [mA]) is set again in the register of the scanner unit upon returning. Thereafter, the data for one line are transferred to the PC while being reading out from the reading buffer in which the data are temporarily stored and converting the resolution in the vertical direction (the arrangement direction of the line CCD) from 360 dpi to 180 dpi. Finally, a line feed operation of one line is executed and the flow returns to the step of checking if the reading region is completed. If the reading region is not completed, the above-mentioned operations are repeated until the reading region is completed. If the reading region is completed, the control enters the heating mode, thus ending the reading operation in the reading range in the case of the resolution of 180 dpi.

The above-mentioned control will be explained below.

(1) To Stabilize Heat Generated by Light Source

In the case of 360 dpi (the accumulation time=256 [$\mu$sec]), the LED current is set to be 20 [mA] upon scanning and 0 [mA] upon returning during the carrier movement, and in this case, since the carrier speed is constant, the average current for one period in the forward and backward movements of the carrier is 10 [mA]. Since the read 1-line data stored in the buffer are transferred to the PC in the return direction of the carrier, there is no transfer overhead, and the next scanning can be started without requiring any wait time. As a consequence, the average current during the reading operation in the reading range is also 10 [mA]. On the other hand, in the case of 180 dpi (the accumulation time=512 [$\mu$sec]), the LED current is always 10 [mA] irrespective of the moving direction of the carrier, and consequently, the average current during the reading operation in the reading range is also 10 [mA]. Furthermore, since a current equal to both the average currents is supplied to the LEDs even during the wait state, the average current to be supplied to the LEDs can be made constant irrespective of the accumulation time, and changes due to heat accumulation of the LEDs during the reading operation can be minimized.

(2) CCD Output

Figure 13:
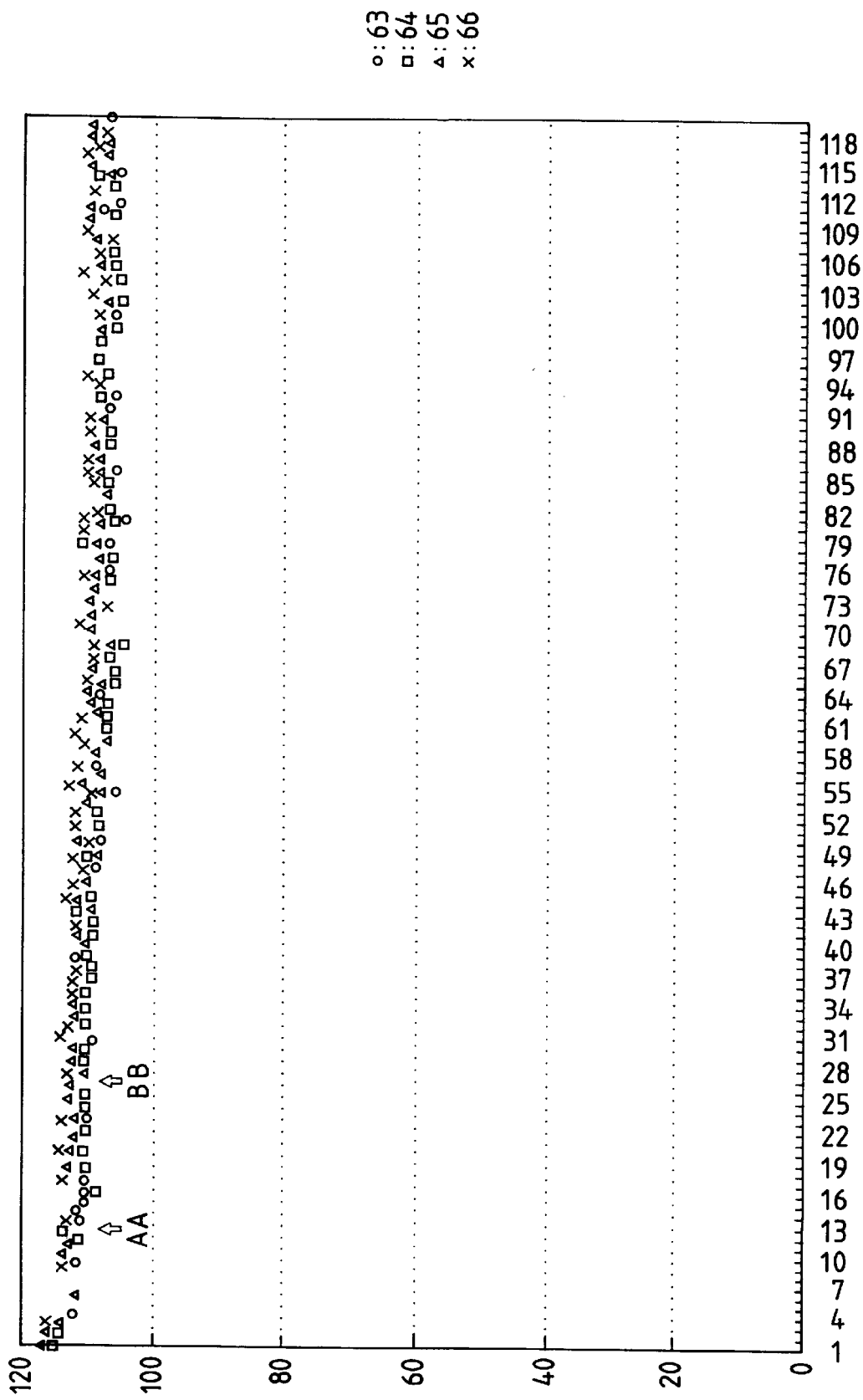
FIG. 13 is a graph showing the CCD output characteristics in the LED control according to the present invention.
Figure 14:
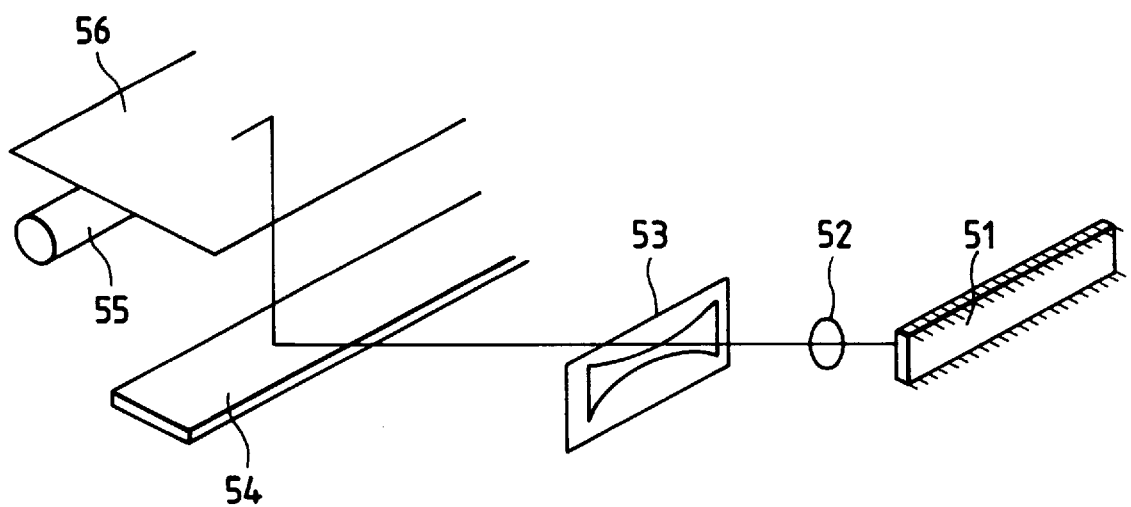
FIG. 14 is a schematic view showing the principle of a conventional image reading apparatus.

In the case of 360 dpi, the accumulation time is 256 [$\mu$sec] and the LED current upon scanning is 20 [mA]. In this case, if the CCD data are output, as indicated by AA in FIG. 13, since the accumulation time is 512 [$\mu$sec] and the LED current upon scanning is 10 [mA] in the case of 180 dpi, data twice those obtained at 360 dpi are output at 180 dpi according to the accumulation time since the CCD output is linear. However, since the LED current, brightness, and CCD output are also linear, data half those obtained at 360 dpi are output at 180 dpi. As a consequence, as the CCD output, these data cancel each other, as indicated by BB in FIG. 13. More specifically, AA and BB have basically the same level, and the CCD output becomes constant irrespective of the accumulation time. Furthermore, a stable output can be supplied to the subsequent A/D converter and shading correction circuit irrespective of the resolution.

In this embodiment, the LED current is switched in two steps for the sake of easy understanding. Alternatively, the LED currents in more steps may be selected. Furthermore, the driving speed upon scanning of the carrier is set to be equal to that upon returning. Such arrangement can be realized if the LED currents can be selected in multiple steps, as described above. In this embodiment, the current control in the heating mode uses a constant current. Alternatively, corresponding duty intermittent control may be performed.

With the above-mentioned arrangement, the light source can be stabilized irrespective of the accumulation time, and a stable, high image quality can always be obtained.

The present invention is especially effective when the circuits must be simplified and the consumption power must be suppressed due to dimensional limitations, such as in the built-in scanner unit of a note personal computer.

The output from the photoelectric conversion means can be made constant irrespective of the accumulation time, and a stable output can be supplied to the subsequent circuits irrespective of the resolution. Therefore, stable image reading can be performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading system comprising:
   (a) photoelectric conversion means for converting light from an original into an image signal;
   (b) a light source for illuminating the original; and
   (c) control means for changing each of an accumulation time of a charge in said photoelectric conversion means and a current to be supplied to said light source while maintaining a product thereof to be a constant.

2. A system according to claim 1, further comprising scanning means for reciprocally scanning said photoelectric conversion means relative to the original, and wherein said control means controls a current to be supplied to said light source during a backward movement to be lower than a current during a forward movement.

3. A system according to claim 2, wherein said control means controls an average current in the forward and backward movements to be constant irrespective of the accumulation time.

4. A system according to claim 3, wherein said control means performs said control when heat accumulation of said light source due to the current is large.

5. A system according to claim 3, wherein said control means controls to supply the average current to said light source when said scanning means stops scanning.

6. A system according to claim 5, wherein said control means intermittently supplies a current to said light source when said scanning means stops scanning.

7. A system according to claim 3, wherein said control means controls to supply the average current to said light source when said scanning means stops scanning.

8. A system according to claim 7, wherein said control means intermittently supplies a current to said light source when said scanning means stops scanning.

9. A system according to claim 7, wherein a plurality of LEDs equivalent to said LED are arranged.

10. A system according to claim 9, wherein said plurality of LEDs are connected in series with each other.

11. A system according to claim 2, wherein said control means performs said control when heat accumulation of said light source due to the current is large.

12. A system according to claim 2, wherein said control means intermittently supplies a current to said light source during the backward movement of said scanning means.

13. A system according to claim 1, further comprising setting means for setting the accumulation time.

14. A system according to claim 1, wherein a light amount of said light source changes linearly with respect to the current.

15. A system according to claim 1, wherein said light source comprises an LED.

16. A system according to claim 1, wherein said photoelectric conversion means comprises a CCD line sensor.

17. A system according to claim 1, further comprising A/D conversion means for converting a signal read by said photoelectric conversion means into a digital signal.

18. A system according to claim 1, further comprising correction means for performing shading correction of a signal read by said photoelectric conversion means.

19. A system according to claim 1, further comprising optical means for irradiating light emitted by said light source onto the original and guiding the light reflected by the original toward said photoelectric conversion means.

20. A system according to claim 1, wherein said image reading system is connectable with a control apparatus.

21. A system according to claim 20, wherein said image reading system is connectable with the control apparatus to be exchangeable with printer unit.

22. A system according to claim 21, further comprising output means for outputting the image signal to the control apparatus via a printer interface.

23. A system according to claim 20, further comprising output means for outputting the image signal to the control apparatus.

24. A control apparatus for an image reading apparatus, which has photoelectric conversion means for converting light from an original into an image signal, and a light source for illuminating the original, comprising control means for changing each of an accumulation time of a charge in said photoelectric conversion means and a current to be supplied to said light source while maintaining a product thereof to be a constant.

25. An apparatus according to claim 24, further comprising scanning means for reciprocally scanning said photoelectric conversion means relative to the original, and wherein said control means controls a current to be supplied to said light source during a backward movement to be lower than a current during a forward movement.

26. An apparatus according to claim 25, wherein said control means controls an average current in the forward and backward movements to be constant irrespective of the accumulation time.

27. An apparatus according to claim 26, wherein said control means performs said control when heat accumulation of said light source due to the current is large.

28. An apparatus according to claim 26, wherein said control means controls to supply the average current to said light source when said scanning means stops scanning.

29. An apparatus according to claim 28, wherein said control means intermittently supplies a current to said light source when said scanning means stops scanning.

30. An apparatus according to claim 26, wherein said control means controls to supply the average current to said light source when said scanning means stops scanning.

31. An apparatus according to claim 30, wherein said control means intermittently supplies a current to said light source when said scanning means stops scanning.

32. An apparatus according to claim 30, wherein a plurality of LEDs equivalent to said LED are arranged.

33. An apparatus according to claim 32, wherein said plurality of LEDs are connected in series with each other.

34. An apparatus according to claim 25, wherein said control means performs said control when heat accumulation of said light source due to the current is large.

35. An apparatus according to claim 25, wherein said control means intermittently supplies a current to said light source during the backward movement of said scanning means.

36. An apparatus according to claim 24, further comprising setting means for setting the accumulation time.

37. An apparatus according to claim 24, wherein a light amount of said light source changes linearly with respect to the current.

38. An apparatus according to claim 24, wherein said light source comprises an LED.

39. An apparatus according to claim 24, wherein said photoelectric conversion means comprises a CCD line sensor.

40. An apparatus according to claim 24, further comprising A/D conversion means for converting a signal read by said photoelectric conversion means into a digital signal.

41. An apparatus according to claim 24, further comprising correction means for performing shading correction of a signal read by said photoelectric conversion means.

42. An apparatus according to claim 24, wherein said image reading apparatus further comprises optical means for irradiating light emitted by said light source onto the original and guiding the light reflected by the original toward said photoelectric conversion means.

43. An apparatus according to claim 24, wherein said image reading apparatus is connectable with said control apparatus.

44. An apparatus according to claim 43, wherein said image reading system is connectable with the control apparatus to be exchangeable with a printer unit.

45. An apparatus according to claim 44, further comprising output means for outputting the image signal to the control apparatus via a printer interface.

46. An apparatus according to claim 43, further comprising output means for outputting the image signal to said control apparatus.

47. An image reading system comprising:
  (a) photoelectric conversion means for converting light from an original into an image signal;
  (b) a light source for illuminating the original;
  (c) scanning means for reciprocally scanning said photoelectric conversion means in forward and backward movements relative to the original; and
  (d) control means for controlling an average current supplied to said light source in the forward and backward movements to be constant.

48. A system according to claim 47, wherein control means controls a current to be supplied to said light source during the backward movement to be lower than a current during the forward movement.

49. A system according to claim 48, wherein said control means performs said control when heat accumulation of said light source due to the current is large.

50. A system according to claim 48, wherein said control means controls to supply the average current to said light source when said scanning means stops scanning.

51. A system according to claim 50, wherein said control means intermittently supplies a current to said light source when said scanning means stops scanning.

52. A system according to claim 50, wherein a plurality of LEDs equivalent to said LED are arranged.

53. A system according to claim 52, wherein said plurality of LEDs are connected in series with each other.

54. A system according to claim 47, wherein said control means performs said control when heat accumulation of said light source due to the current is large.

55. A system according to claim 47, wherein said control means controls to supply the average current to said light source when said scanning means stops scanning.

56. A system according to claim 55, wherein said control means intermittently supplies a current to said light source when said scanning means stops scanning.

57. A system according to claim 47, wherein said control means intermittently supplies a current to said light source during the backward movement of said scanning means.

58. A system according to claim 47, wherein a light amount of said light source changes linearly with respect to the current.

59. A system according to claim 47, wherein said light source comprises an LED.

60. A system according to claim 47, wherein said photoelectric conversion means comprises a CCD line sensor.

61. A system according to claim 47, further comprising A/D conversion means for converting a signal read by said photoelectric conversion means into a digital signal.

62. A system according to claim 47, further comprising correction means for performing shading correction of a signal read by said photoelectric conversion means.

63. A system according to claim 47, further comprising optical means for irradiating light emitted by said light source onto the original and guiding the light reflected by the original toward said photoelectric conversion means.

64. A system according to claim 47, wherein said image reading system is connectable with a control apparatus.

65. A system according to claim 64, wherein said image reading system is connectable with the control apparatus to be exchangeable with a printer unit.

66. A system according to claim 65, further comprising output means for outputting the image signs to the control apparatus via a printer interface.

67. A system according to claim 64, further comprising output means for outputting the image signal to the control apparatus.

68. A control apparatus for an image reading apparatus, which includes photoelectric conversion means for converting light from an original into an image signal, a light source for illuminating the original, and scanning means for reciprocally scanning said photoelectric conversion means in forward and backward movements relative to the original, comprising control means for controlling an average current supplied to said light source in the forward and backward movements to become constant.

69. An apparatus according to claim 68, wherein said control means controls a current to be supplied to said light source during the backward movement to be lower than a current during the forward movement.

70. An apparatus according to claim 69, wherein said control means performs said control when heat accumulation of said light source due to the current is large.

71. An apparatus according to claim 69, wherein said control means controls to supply the average current to said light source when said scanning means stops scanning.

72. An apparatus according to claim 71, wherein said control means intermittently supplies a current to said light source when said scanning means stops scanning.

73. An apparatus according to claim 71, wherein a plurality of LEDs equivalent to said LED are arranged.

74. An apparatus according to claim 73, wherein said plurality of LEDs are connected in series with each other.

75. An apparatus according to claim 68, wherein said control means performs said control when the accumulation of said light source due to the current is large.

76. An apparatus according to claim 68, wherein said control means controls to supply the average current to said light source when said scanning means stops scanning.

77. An apparatus according to claim 76, wherein said control means intermittently supplies a current to said light source when said scanning means stops scanning.

78. An apparatus according to claim 68, wherein said control means intermittently supplies a current to said light source during the backward movement of said scanning means.

79. An apparatus according to claim 68, wherein a light amount of said light source changes linearly with respect to the current.

80. An apparatus according to claim 68, wherein said light source comprises an LED.

81. An apparatus according to claim 68, wherein said photoelectric conversion means comprises a CCD line sensor.

82. An apparatus according to claim 68, further comprising A/D conversion means for converting a signal read by said photoelectric conversion means into a digital signal.

83. An apparatus according to claim 68, further comprising correction means for performing shading correction of a signal read by said photoelectric conversion means.

84. An apparatus according to claim 68, wherein said image reading apparatus further comprises optical means for irradiating light emitted by said light source onto the original and guiding the light reflected by the original toward said photoelectric conversion means.

85. An apparatus according to claim 68 wherein said image reading apparatus is connectable with said control apparatus.

86. An apparatus according to claim 85, wherein said image reading system is connectable with the control apparatus to be exchangeable with a printer unit.

87. An apparatus according to claim 86, further comprising output means for outputting the image signal to the control apparatus via a printer interface.

88. An apparatus according to claim 85, further comprising output means for outputting the image signal to said control apparatus.

* * * * *

UNITED STATES PATENT AND TRADEMARK OFFICE
CERTIFICATE OF CORRECTION

PATENT NO. : 5,844,695
DATED : December 1, 1998
INVENTOR(S) : NAOHISA SUZUKI

It is certified that error appears in the above-identified patent and that said Letters Patent is hereby corrected as shown below:

COLUMN 2

Line 1,   "a-note" should read --a notebook--;
    Line 2,   "the consumption power" should read --power consumption--; and
    Line 15, "an" should read --to an--.

COLUMN 5

Line 44, "express" should read --expresses--; and
    Line 45, "an" should read --to an--.

COLUMN 6

Line 5,  "reading" should read --read--; and
    Line 26, "reading" should read --read--.

COLUMN 8

Line 4,  "9" should read --14--; and
            "claim 7" should read --claim 13--;
    Line 6,  "10" should read --15--; and
            "claim 9" should read --claim 14--;
    Line 8,  "11" should read --9--;
    Line 11, "12" should read --10--;
    Line 14, "13" should read --11--;
    Line 16, "14" should read --12--;
    Line 19, "15" should read --13--; and
    Line 37, "with" should read --with a--.

UNITED STATES PATENT AND TRADEMARK OFFICE
CERTIFICATE OF CORRECTION

PATENT NO. : 5,844,695
DATED : December 1, 1998
INVENTOR(S) : NAOHISA SUZUKI

It is certified that error appears in the above-identified patent and that said Letters Patent is hereby corrected as shown below:

COLUMN 9

Line 10, "32" should read --37--; and
               "claim 30" should read --claim 36--;
    Line 12, "33" should read --38--; and
               "claim 32" should read --claim 37--;
    Line 14, "34" should read --32--;
    Line 17, "35" should read --33--;
    Line 21, "36" should read --34--;
    Line 23, "37" should read --35--; and
    Line 26, "38" should read --36--.

COLUMN 10

Line 10, "52" should read --58--; and
               "claim 50" should read --claim 57--;
    Line 12, "53" should read --59--; and
               "claim 52" should read --claim 58--;
    Line 14, "54" should read --52--;
    Line 17, "55" should read --53--;
    Line 20, "56" should read --54--; and
               "claim 55" should read --claim 53--;
    Line 23, "57" should read --55--;
    Line 26, "58" should read --56--;
    Line 29, "59" should read --57--; and
    Line 49, "signs" should read --signal--.

COLUMN 11

Line 7, "73" should read --79--; and
              "claim 71" should read --claim 78--;

COLUMN 11 (Cont.)

UNITED STATES PATENT AND TRADEMARK OFFICE
CERTIFICATE OF CORRECTION

PATENT NO.  : 5,844,695
DATED       : December 1, 1998
INVENTOR(S) : NAOHISA SUZUKI It is certified that error appears in the above-identified patent and that said Letters Patent is hereby corrected as shown below:

<u>COLUMN 11</u> (Cont.)

```
Line 9,   "74" should read --80--; and
          "claim 73" should read --claim 79--;
Line 11,  "75" should read --73--;
Line 14,  "76" should read --74--;
Line 17,  "77" should read --75--; and
          "claim 76" should read --claim 74--;
Line 20,  "78" should read --76--;
Line 24,  "79" should read --77--; and
Line 25,  "80" should read --78--.
```

Signed and Sealed this

Twenty-fourth Day of October, 2000

Attest:

Q. TODD DICKINSON

*Attesting Officer*          *Director of Patents and Trademarks*